Feb. 27, 1968     E. GORIN ETAL     3,371,049
REGENERATION OF ZINC HALIDE CATALYST USED IN
HYDROCRACKING OF POLYNUCLEAR HYDROCARBONS
Filed Nov. 15, 1965                    2 Sheets-Sheet 1

INVENTORS:
Everett Gorin
Clyde W. Zielke
Robert T. Struck

United States Patent Office 3,371,049
Patented Feb. 27, 1968

3,371,049
REGENERATION OF ZINC HALIDE CATALYST USED IN HYDROCRACKING OF POLYNUCLEAR HYDROCARBONS
Everett Gorin, Pittsburgh, Robert T. Struck, Bridgeville, and Clyde W. Zielke, Pittsburgh, Pa., assignors, by direct and mesne assignments, of one-half to Consolidation Coal Company, Liberty, Pa., a corporation of Delaware, and one-half to the United States of America as represented by the Secretary of the Interior
Filed Nov. 15, 1965, Ser. No. 507,969
7 Claims. (Cl. 252—413)

ABSTRACT OF THE DISCLOSURE

Regenerating spent molten zinc halide catalyst from a hydrocracking process for polynuclear aromatic feedstocks by contacting the spent catalyst with an aromatic solvent and aqueous HCl, and subsequently driving off hydrogen sulfide, water and ammonia.

This invention relates to the regeneration of molten zinc halide catalysts. Catalysts of this type are particularly useful for utilization in catalytic hydrocracking of predominantly polynuclear aromatic hydrocarbonaceous materials, specially for the conversion to gasoline of substantially nondistillable high molecular weight predominantly polynuclear aromatic hydrocarbonaceous feedstocks which may contain appreciable quantities of nitrogen, oxygen and sulfur compounds, as well as unfilterable ash contaminants.

A process for utilizing molten zinc halide catalysts in such a type of catalytic hydrocracking is described in our copending U.S. application Ser. No. 449,904 filed Apr. 21, 1965. As set forth in that application, we have found that polynuclear hydrocarbons, even those which are nondistillable may be readily converted in the presence of a large quantity of molten zinc chloride or bromide, to low boiling liquids suitable for fuels such as gasoline. Some of the zinc halide is consumed by reaction with the nitrogen and sulfur compounds in the feedstock. A successful commercial process utilizing molten zinc halide catalysts must therefore provide for the regeneration of the catalyst.

It is an object of this invention to provide a method for regenerating spent zinc halide catalyst used in the conversion of predominantly polynuclear hydrocarbonaceous feedstock to gasoline by hydrocracking in the presence of hydrogen at high temperature and pressure. In particular it is an object to remove sulfur and nitrogen compounds from the catalyst to provide substantially pure zinc halide catalyst for recycle to the hydrocracking zone. Another object of this invention is to provide a method for mixing spent catalyst with an aromatic solvent and dilute aqueous hydrochloric acid to form a first inorganic aqueous phase containing zinc compounds and a second organic phase containing aromatic solvent and organic residue contained in the spent catalyst.

Figure 1:
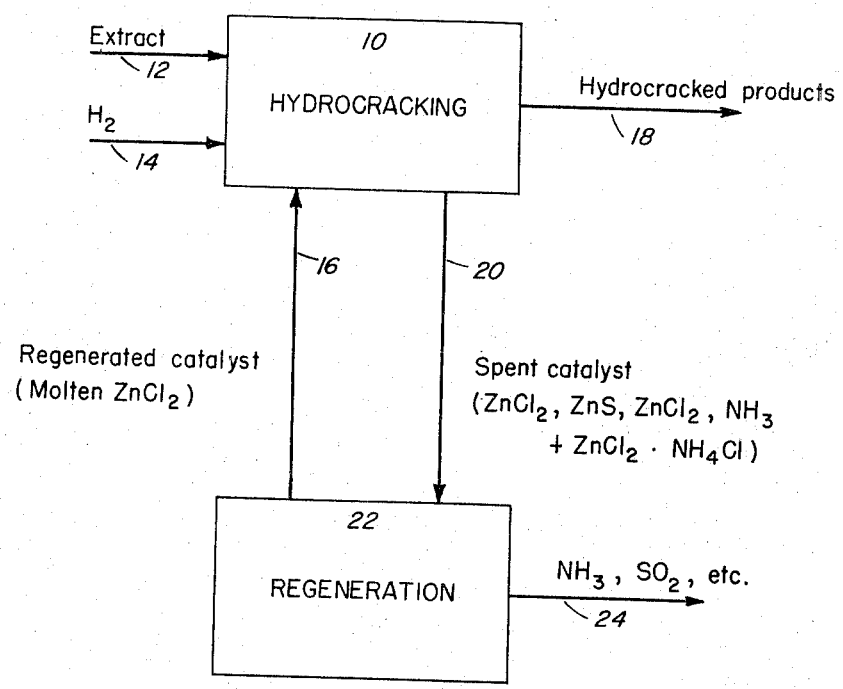
Figure 2:
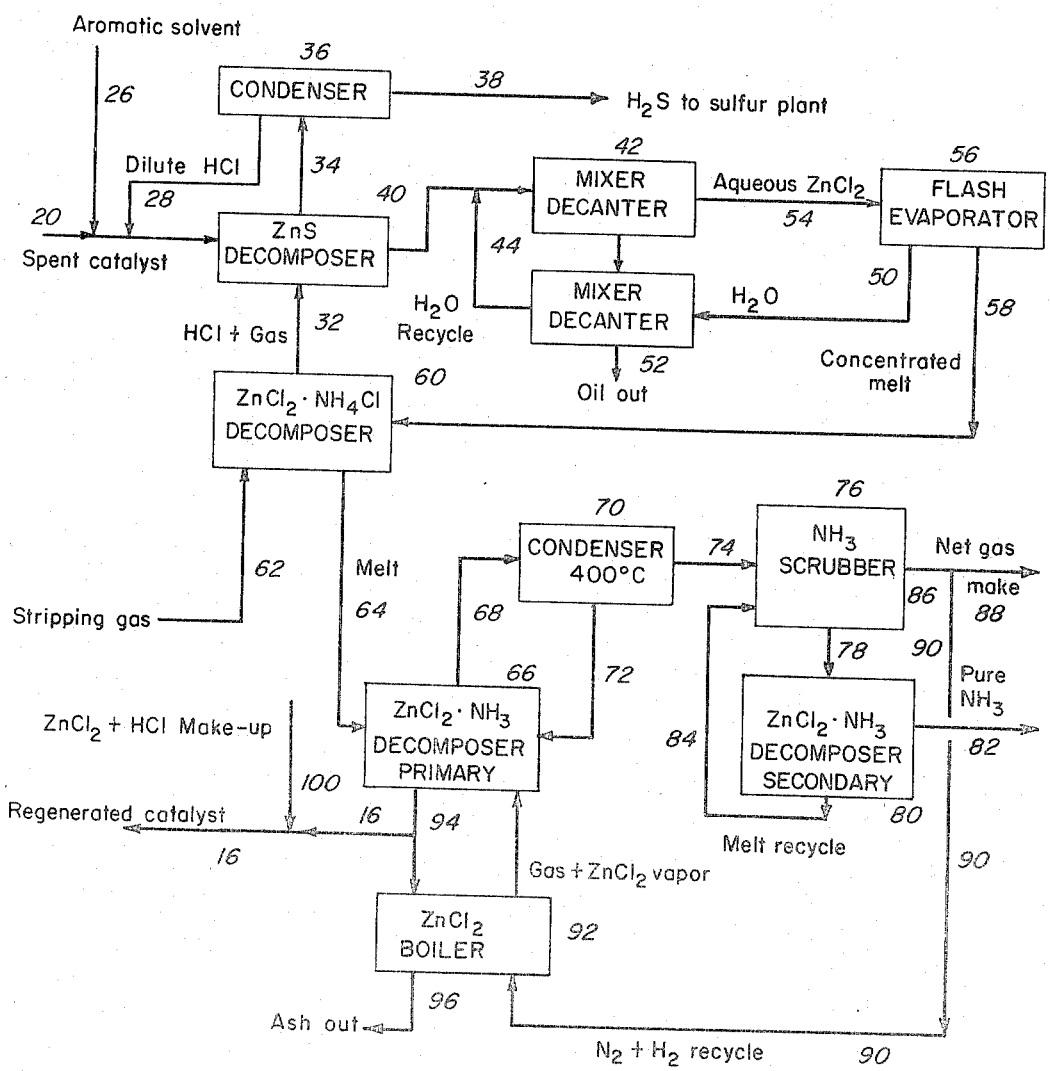

These and other objects and features of the present invention will become apparaent from the following description and in the appended drawing in which:

FIG. 1 is a schematic representation of the overall process for hydrocracking a feedstock and regeneration of spent catalyst; and FIG. 2 is a flow sheet of the novel regeneration process for removing organic residue, sulfur and nitrogen compounds from the spent catalyst.

The problems associated with the regeneration of the zinc halide may be conveniently described in connection with FIGURE 1 of the accompanying drawings. In FIGURE 1, there is shown schematically, the process of our invention in its broadest aspect. For ease of reference, zinc chloride, $ZnCl_2$, is used as illustrative of the catalyst, and coal extract as illustrative of a sulfur- and nitrogen-containing polynuclear hydrocarbon. Numeral 10 designates a suitable Hydrocracking Zone to which coal extract and hydrogen are fed through conduits 12 and 14, respectively. Regenerated molten zinc chloride is introduced through conduit 16 into the Hydrocracking Zone 10. The operating conditions maintained in the Hydrocracking Zone 10 are as follows:

Temperature ° F. 500–875
Pressure p.s.i.g. 500–10,000
Liquid hourly space velocity 0.25–4.20
$H_2$/fedstock ratio s.c.f./lb. 5–50
$ZnCl_2$ catalyst (at least 15 wt. percent of hydrocarbon inventory in the Hydrocracking Zone)

The hydrocracked products, i.e. low boiling hydrocarbons, are withdrawn through a conduit 18.

The following reactions involving $ZnCl_2$ occur in the Hydrocracking Zone:

(1) $ZnCl_2 + H_2S = ZnS + 2HCl$
(2) $ZnCl_2 + NH_3 = ZnCl_2 \cdot NH_3$
(3) $ZnCl_2 \cdot NH_3 + HCl_2 = ZnCl_2 \cdot NH_4Cl$ The products of these three reactions, together with $ZnCl_2$ itself and unconverted high boiling or nondistillable coal extract, are withdrawn through a conduit 20 to a Regeneration Zone 22. In this zone, the products ZnS, $ZnCl_2 \cdot NH_3$ and $ZnCl_2 \cdot NH_4Cl$ must be reconverted to $ZnCl_2$. The nitrogen and sulfur portions are discharged as $NH_3$ and $SO_2$, respectively, through a conduit 24. The molten zinc chloride is returned to the Hydrocracking Zone through conduit 16.

FIGURE 2 of the accompanying drawings shows, schematically, the regeneration process of the present invention. The spent catalyst withdrawn from the Hydrocracking Zone through conduit 20 is a single phase system for all practical purposes. In other words, the inorganic salts and the organic residue form a single phase or stable suspension. An aromatic solvent is introduced into the spent catalyst through a conduit 26. Two phases are immediately formed, an organic and an inorganic phase. Aqueous hydrochloric acid is also introduced into conduit 20 via a conduit 28. This acid joins the inorganic phase and helps to ensure the formation of the phases, but more importantly, serves to convert the zinc sulfide in the ZnS Decomposer 30 back to zinc chloride, in accordance with the equation:

(4) $ZnS + 2HCl_2 = ZnCl_2 + 2H_2S$

The temperature maintained in the Decomposer is 50–200° C. Supplemental HCl is introduced into the Decomposer through a conduit 32, as will be more fully described shortly. The product $H_2S$ gas and any vaporous HCl are discharged through a conduit 34 to a condenser 36 where the $H_2S$ gas is discharged separately through a conduit 38 to a sulfur plant. The vaporous HCl is condensed and returned via conduit 28 to the inlet conduit 20.

*Mixer-Decanter*

The two-phase liquid product from the ZnS Decomposer is conducted through a pipe 40 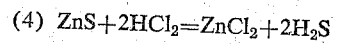 to a Mixer-Decanter 42. Here the two phases are thoroughly washed with water introduced into conduit 40 from a conduit 44. The temperature is maintained between about 200 and 250° C. The washed phases are separated into an oil phase and an aqueous phase by decantation. The oil phase is withdrawn through a conduit 46 to a second Mixer-Decanter 48 where the oil phase is again washed with water introduced into the Decanter from a conduit 50. The washed oil is separated from the wash water by decantation, and discharged through conduit 52. The wash water containing some zinc chloride as a result of the washing is recycled through conduit 44.

*Flash Evaporator*

The aqueous phase from the Mixer-Decanter 42 is conducted via a conduit 54 to a Flash Evaporator 56. The water is flashed off the aqueous phase leaving a concentrated melt of $ZnCl_2$, $ZuCl_2 \cdot NH_4Cl$ and $ZnCl_2 \cdot NH_3$. The latter two adducts may not have the molar ratios indicated for the zinc chloride and the adductant. However, for convenience of reference, they are so identified. The water evaporated in the Flash Evaporator is conducted to the Mixer-Decanter via conduit 50.

$ZnCl_2 \cdot NH_4Cl$ *Decomposer*

The concentrated melt from the Flash Evaporator 56 is conducted via a conduit 58 to a suitable vessel 60 for the decomposition of the $NH_4Cl$ adduct, in accordance with the following equation:

(5) $ZnCl_2 \cdot NH_4Cl \rightarrow ZnCl_2 \cdot NH_3 + HCl$

A temperature between 325 and 470° C. is maintained in the vessel 60 while a suitable inert stripping gas, introduced via a conduit 62, is passed through the melt to remove the evolved HCl. The latter, together with the stripping gas, is conducted to the ZnS Decomposer via conduit 32.

$ZnCl_2 \cdot NH_3$ *Decomposer-Primary and Secondary*

The concentrated melt of $ZnCl_2$, now containing $ZnCl_2$ and $ZnCl_2 \cdot NH_3$, is withdrawn from vessel 60 via a conduit 64 and fed to a first or Primary $ZnCl_2 \cdot NH_3$ Decomposer 66. In this Decomposer, which is held at a temperature between 525 and 600° C., the decomposition of $ZnCl_2 \cdot NH_3$ occurs as follows:

(6) $ZnCl_2 \cdot NH_3 \rightarrow ZnCl_2 + NH_3$

Some nitrogen and hydrogen are also produced as a result of the decomposition of $NH_3$. The product gases and any vaporous $ZnCl_2$ and $ZnCl_2 \cdot NH_3$ are discharged through a conduit to a condenser 70 which is maintained at a temperature in the neighborhood of 400° C. At the latter temperature, any $ZnCl_2$ and $ZnCl_2 \cdot NH_3$ are condensed and recycled through a conduit 72 to the Primary Decomposer 66. The ammonia and other gases are carried via a conduit 74 to an $NH_3$ Scrubber 76 where the ammonia is separated from the gases nitrogen and hydrogen. This separation may be conveniently effected by using $ZnCl_2 \cdot NH_3$ as the scrubbing agent, in accordance with the following equation:

(7) $ZnCl_2 \cdot NH_3 + NH_3 \rightarrow ZnCl_2 \cdot 2NH_3$

The above reaction is effected at a temperature between 250 and 270° C. The double ammoniate $ZnCl_2 \cdot 2NH_3$ is withdrawn via a conduit 78 to a second or Secondary $ZnCl_2 \cdot NH_3$ Decomposer 80. The $ZnCl_2 \cdot 2NH_3$ is decomposed at a temperature of about 400° C., as follows:

(8) $ZnCl_2 \cdot 2NH_3 \rightarrow ZnCl_2 \cdot NH_3 + NH_3$

The gaseous ammonia, so produced, is quite pure and is discharged via a conduit 82. The ammoniate $ZnCl_2 \cdot NH_3$ in molten state is recycled through a conduit 84 to the $NH_3$ Scrubber 76. The gas from which the ammonia has been removed consists essentially of nitrogen and hydrogen, and is removed through a conduit 86. A portion of it is discharged from the system via a conduit 88, while the remainder is recycled through a conduit 90 to a $ZnCl_2$ Boiler 92.

$ZnCl_2$ *Boiler*

The $ZnCl_2$ Boiler 92 serves primarily to rid the system of any ash that tends to collect because of the ash content of the coal extract fed to the Hydrocracking Zone. Some of the $ZnCl_2$ regenerated in the Primary $ZnCl_2 \cdot NH_3$ Decomposer 66 is sent to the Boiler via a conduit 94, while the rest is recycled through conduit 16 to the Hydrocracking Zone. The Boiler is maintained at a temperature between 600 and 675° C. The $ZnCl_2$ is vaporized; ash drops out, and is removed through a pipe 96. The $ZnCl_2$ vapor is carried by the gas from conduit 90 back to the zone 66 via a conduit 98.

Any loss of $ZnCl_2$ or of HCl in the system is made up by introduction thereof through a conduit 100 into the recycle line 16.

What is claimed is:

1. A process for regenerating spent molten zinc halide from a hydrocracking operation, said zinc halide selected from the group consisting of zinc chloride and bromide said spent halide containing ZnS and zinc halide-ammonia adduct, comprising:
    (a) mixing said spent catalyst with an aromatic solvent to form a two-phase mixture comprising an inorganic phase and an organic phase, said inorganic phase containing ZnS and zinc halide-ammonia adduct;
    (b) contacting said inorganic phase with aqueous HCl to convert said ZnS in said inorganic phase to $ZnCl_2$ and $H_2S$;
    (c) removing said $H_2S$;
    (d) then removing water from said inorganic phase; and then
    (e) removing ammonia from said inorganic phase to produce regenerated molten zinc halide.

2. The process of claim 1 further including removing ash residue from said regenerated molten zinc halide.

3. The process of claim 1 wherein said organic phase is separated from said inorganic phase after said $H_2S$ removal step, but prior to said water removal step.

4. The process of claim 1 wherein the step of removing said $H_2S$ comprises driving off said $H_2S$ as a gas stream containing HCl vapor; condensing said HCl vapor, and employing said condensed HCl as said aqueous HCl in said step of contacting said inorganic phase with aqueous HCl.

5. The process of claim 4 wherein said spent catalyst also includes zinc halide-ammonia halide adduct, selected from the group consisting of the chloride and the bromide, and wherein said ammonia removal step comprises thermally decomposing said zinc halide-ammonium halide adduct in said inorganic phase to zinc halide-ammonia adduct and hydrogen halide; and then thermally decomposing zinc halide-ammonia adduct in said inorganic phase to $NH_3$ and zinc halide.

6. The process of claim 5 wherein said spent zinc halide is zinc chloride, whereby said zinc halide-ammonia halide adduct is zinc chloride-ammonium chloride adduct, whereby said hydrogen halide produced during said first mentioned thermal decomposition step is HCl; and recycling said HCl produced in said thermal decomposition step to said ZnS conversion step as supplemental HCl therein.

7. The process of claim 6 wherein the step of removing water from said inorganic phase comprises flashing off said water.

References Cited

UNITED STATES PATENTS

| | | | |
|---|---|---|---|
| 1,869,799 | 8/1932 | Danner | 208—108 |
| 2,404,551 | 7/1946 | Upham | 260—683.7 |
| 2,657,175 | 10/1953 | Mason | 208—108 |
| 2,749,288 | 6/1956 | Watkins | 208—125 |

DANIEL E. WYMAN, *Primary Examiner.*

ABRAHAM RIMENS, *Examiner.*

L. G. MANDONI, *Assistant Examiner.*